Jan. 12, 1937. W. E. SYKES 2,067,551
METAL CUTTING MACHINE
Filed Feb. 25, 1936 4 Sheets-Sheet 1
Fig.1
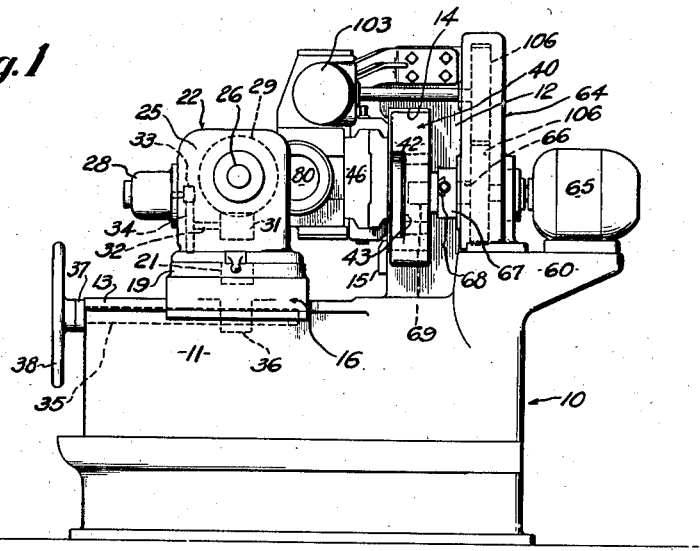
Fig.5
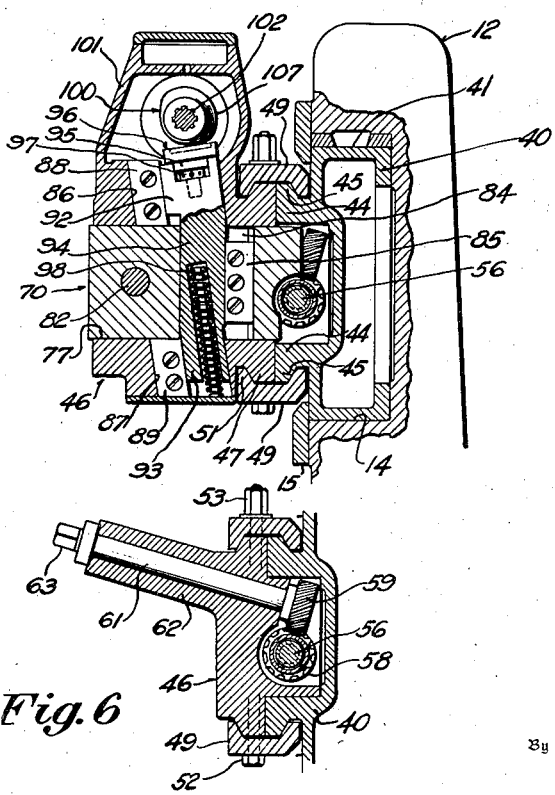
Fig.6
Fig.11
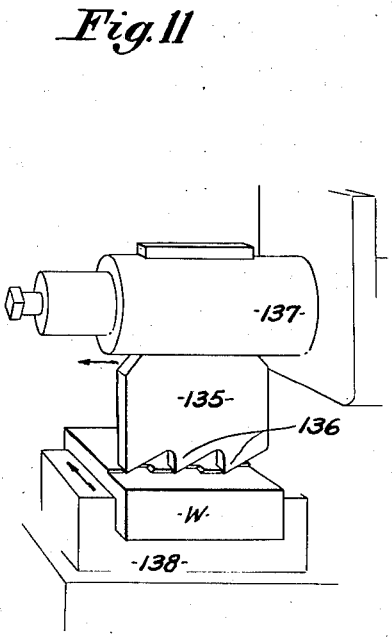
Inventor
William E. Sykes
By
Albert R. Henry
Attorney Inventor
William E. Sykes
Attorney Jan. 12, 1937.   W. E. SYKES   2,067,551
METAL CUTTING MACHINE
Filed Feb. 25, 1936   4 Sheets-Sheet 3
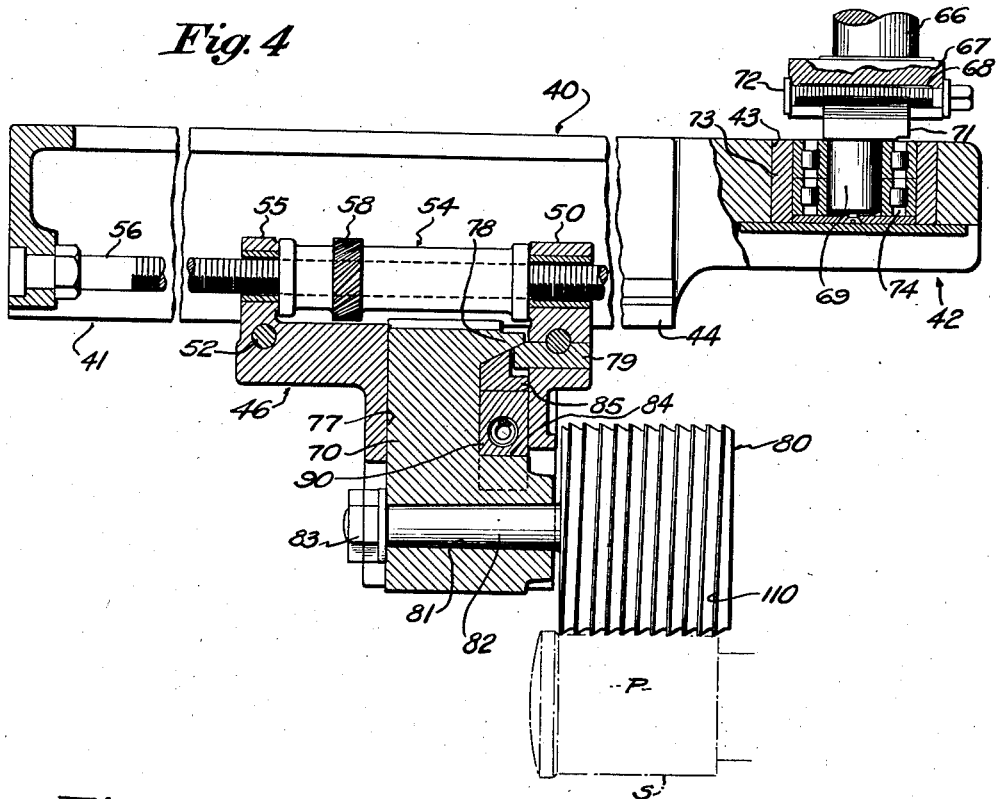
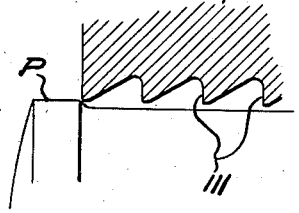
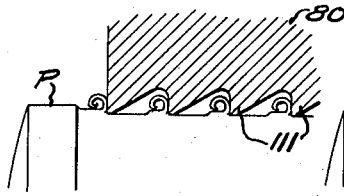
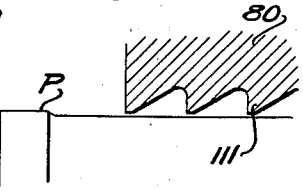
Inventor
William E. Sykes
By
Albert R. Henry
Attorney Inventor
William E. Sykes
By
Albert R. Henry
Attorney Patented Jan. 12, 1937

2,067,551

UNITED STATES PATENT OFFICE 2,067,551

METAL CUTTING MACHINE

William E. Sykes, Buffalo, N. Y.

Application February 25, 1936, Serial No. 65,635

15 Claims. (Cl. 90—38)

This invention relates to a machine for cutting or shaping the surface of a metal object, and it has particular reference to a machine including a multi-edged cutting tool in which the several cutting edges are caused to take small overlapping cuts from a continuous surface of the work being treated.

One purpose of the present invention is to devise a metal cutting machine with which the surface of the work being treated may be cut to the desired shape or dimensions both rapidly and accurately. Heretofore, the customary method of cutting the surface of such work has been to contact the entire surface with a single tool, either, for example, by moving the tool in a straight line over the work, as in a planer, or circumferentially, by means of a lathe. In such modes of operation, the cutting edge of the tool traverses the entire surface, or a certain given portion of the surface of the work.

According to the present invention, this customary mode of cutting is not employed, but a plurality of cutters, whose cutting edges lie in a common plane or other reference surface, are moved through relatively short overlapping distances over the surface of the work, so that the length of the surface treated is approximately equal to or somewhat greater than the overall length of the stroke of the tool. While the overlapping reciprocating action of the cutters is taking place, the work and the cutters may be slowly moved transversely with respect to each other, if it be desired to treat a substantial area, or, if it be desired to cut a slot or groove, the cutters and the work are merely fed inwardly with respect to each other.

By applying this mode of cutting, the surface may be finished to the desired dimensions with satisfactory accuracy, comparable with that heretofore attained, and with the benefits of saving in time and reduction of the wear on the tool edges.

The invention further involves a number of improvements in cutting machines, the nature of which, in addition to the modes of attaining the foregoing objects, will be better understood from the following description and claims, regarded in connection with the accompanying drawings, wherein:

Fig. 1 is a side elevation of the machine;

Fig. 4 is an enlarged horizontal section through the tool carriage taken on the line 4—4 of Fig. 3;

Fig. 5 is an enlarged cross section on the line 5—5 of Fig. 2;

Fig. 6 is a section on the line 6—6 of Fig. 2;

Figure 2:
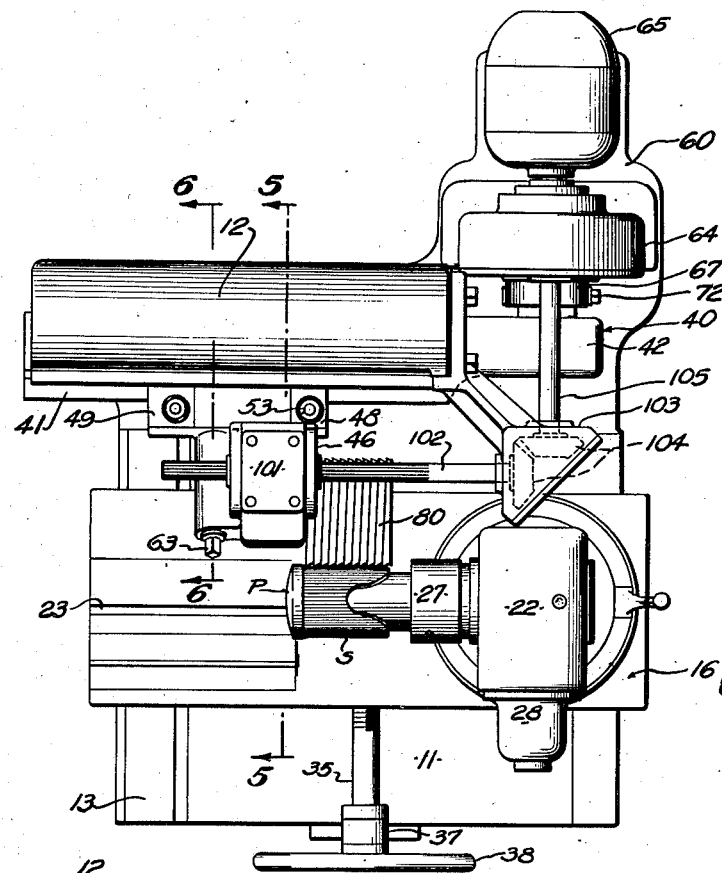
Figs. 2 and 3 are a plan and front elevation thereof respectively, shown on an enlarged scale.
Figure 14:
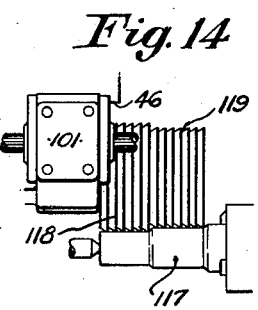
Figure 3:
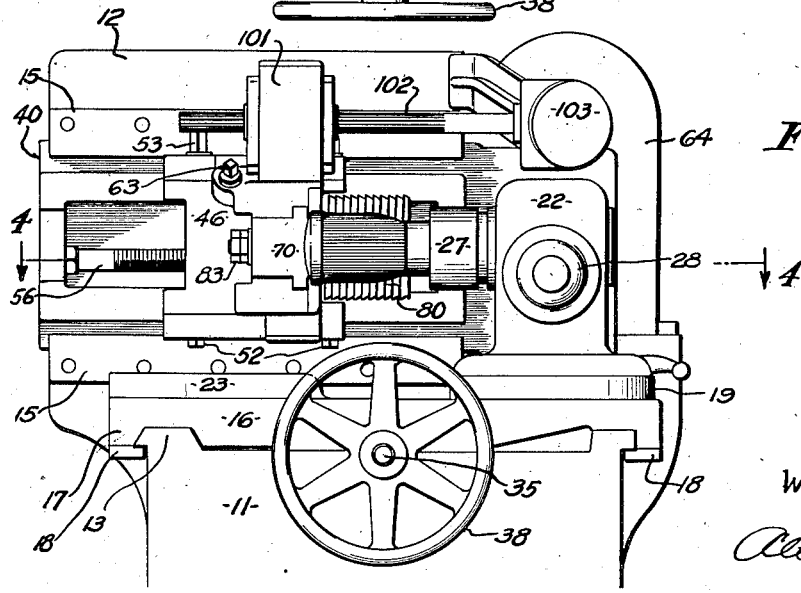
Figure 12:
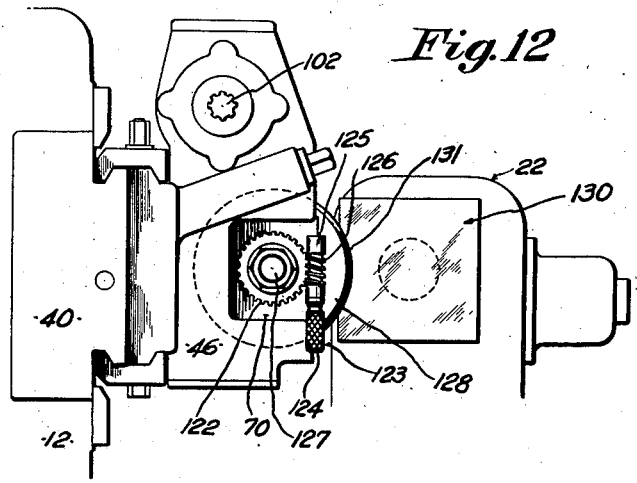
Figure 13:
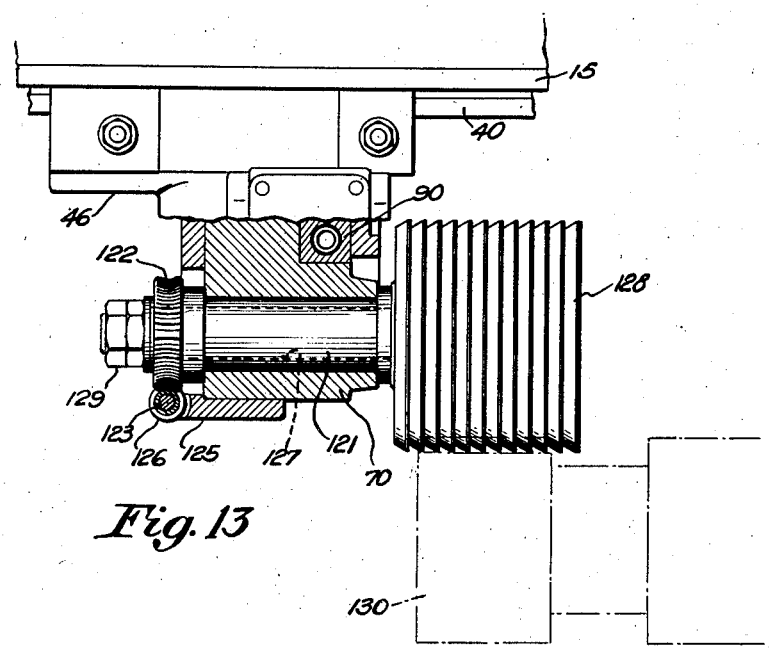

Figs. 7, 8, and 9 are enlarged views showing progressively the movement of the cutter over the work surface;

Fig. 10 is a diagrammatic view showing the movement of the cutter during the relief and cutting stroke cycle;

Fig. 11 is a diagrammatic perspective view of a planer equipped with the tool set-up of the invention;

Fig. 12 is a fragmentary end view, as seen from the left in Figs. 2 and 3, of such machine modified to include an adjustment mechanism for the cutter;

Fig. 13 is a view, partly in plan and partly in section, of the modification shown in Fig. 12; and Fig. 14 is a view of a different form of cutter which may be utilized in the machine.

For illustrative purposes, the machine of Fig. 1 is shown as set up to rough finish the cylindrical surface S of a piston P. In Fig. 11, the work W is assumed to have a flat surface, while in Figs. 12 and 13 the machine is set up to provide for in-feeding to cut a groove. In Fig. 14, there are a plurality of cutter units operating on shouldered work, such as an axle.

The machine is provided with a base 10 having horizontally and vertically disposed portions 11 and 12, the former portion being formed with longitudinally disposed slides 13 and the latter portion having transverse slide bearings 14 to which are secured slide strips 15. A work carriage 16, mounted for longitudinal sliding movement on the base portion 11, is formed with slide bearings 17 engaging the slides 13 and is retained thereon by attached strips 18. The upper surface of the carriage 16 is formed at one extremity with a vertical bearing 19 which rotatably receives the post structure 21 of a turret 22, while at the opposite extremity it is formed with transverse slides 23 on which may be mounted a tailstock (not shown) in the event that the proportions of the work demand it.

The turret structure includes a casing 25 (Fig. 1) containing suitable bearings for rotatably mounting a spindle 26, which projects from the casing and receives a chuck 27 of any standard type, which, in this case, internally grips the piston P. The spindle is driven at a relatively slow speed by a motor 28 through reduction gearing including a worm wheel 29 secured to the spindle, a worm 31 meshing therewith and mounted on a countershaft 32, and a meshing pinion 33 and gear 34 mounted on the motor shaft and countershaft respectively.

The work carriage 16 may be adjusted toward the transverse portion 12 by means of a feed screw 35 engaging a nut 36 (Fig. 1) on the carriage and mounted in a bearing 37 secured to the base 10. A hand wheel 38 is secured to the extremity of the screw to permit manual operation.

A tool holding and operating structure is mounted in the vertical portion 12 and it comprises a reciprocating carriage 40 having a slide portion 41 received in the transverse slide bearings 14, and an extension 42 protruding from the right hand end of the portion 11 and formed with a rectilinear crank bearing 43 (Fig. 4). The portion 41 of the carriage is formed with spaced projecting flanges 44 terminating in tapered rails 45.

A cutter saddle 46 is formed with tapered rails 47 which are adapted to abut the rails 45 and which are secured thereto by clamping bars 48 and 49 having complementary flange portions 51 for engaging the tapered portions of the rails. Bolts 52 extend through the saddle to connect the bars, and they may be drawn up by nuts 53 to bring the bars into clamping engagement.

The saddle 46 may be adjusted along the rails 45 of the carriage by means of a manually operable mechanism (Figs. 4 and 6) including a nut 54 rotatably mounted between lugs 50 and 55 on the saddle and engaging a screw 56 which is secured against rotation at opposite ends of the carriage 40.

The nut is formed with an external spiral gear 58 (Figs. 4 and 6) which is engaged by a complementary gear 59 secured to a forwardly extending shaft 61. The shaft is mounted in a bearing 62 forming part of the saddle structure and its projecting portion 63 may be engaged by a suitable tool to effect the rotation of the nut 54 and thus cause the movement of the accompanying saddle to any desired position on the carriage 40, whereupon it may be rigidly clamped by the bars 48 and 49, as heretofore described.

The carriage 40 is operated by a motor 65, which, together with a gear housing 64, is mounted on a pedestal 60 forming part of the base 10. A crankshaft 66 is directly operated by the motor, and it extends through suitable bearings in the housing 64 and is formed at its outer extremity with a plate 67 (Figs. 1 and 4) having a transverse slide bearing 68 therein. A crank arm 69 is formed with a slide 71 which is received in the plate bearing 68, and it is engaged by a screw 72 which is rotatably mounted in the plate. A rectilinear cage 73 is slidably mounted for vertical movement within the bearing 43 of the carriage 40, and it contains bearings 74 which receive the crank arm 69. The eccentric relation between the crank arm and the shaft 66 may be varied by manipulating the screw 72, and thus the stroke of the carriage 40 may be adjusted to suit the tool set-up, to which, as hereinafter described, it bears a direct relation.

As best shown in Figs. 4 and 5, the saddle is formed with an internal bearing 77 for slidably receiving a cutter support block 70, which is operated by a mechanism which causes its lateral movement relative to the carriage 40 to provide a cutter relief stroke. At its inner extremity, the block is formed with a flange 78 which is adapted to engage a stop member 79 inserted and secured in the saddle, which thus determines the outer limit of movement of the block 70. The outer end of the block is formed with a transverse opening 81 through which the spindle 82 of a cutter 80 is inserted and secured by nuts 83. A vertical groove 84 is cut in one side of the block, at the rear of which an insert 85 is secured. The adjacent portion of the saddle is formed with angular guide slots 86 and 87 containing bearing inserts 88 and 89.

A block actuating member 90 is formed with angular extremities or cam portions 92 and 93 engaging in the slots 86 and 87 of the saddle, and a central portion 94 engaging in the block groove 84. The upper extremity of the member 90 is slotted to receive the shank 95 of a tappet 96 which may be adjusted by a supporting screw 97 engaged in the member 90. The actuating member 90 is constantly urged in an upward direction by a spring 98, which causes an outward shifting of the member 90 and accompanying block, which is terminated when the stop flange 78 engages the stop member 79, as shown in Fig. 4.

The inward or relief movement of the block 70 is controlled by a cam 100 which is disposed in a casing 101 on the saddle 46. The cam is mounted on a splined transversely extending shaft 102 which projects through the casing and to the right of the portion 11, whence it extends through a bracket 103 and receives a bevel gear 104 (Fig. 2). The gear 104 meshes with a similar gear secured to a longitudinally extending shaft 105 which enters the housing 64. Spur gears 106 disposed in the housing 64 connect the shaft 105 for operation by the crankshaft 66 (Fig. 1).

It will thus be observed that during each cycle of reciprocation of the tool carriage 40, the cam 100 performs a complete revolution, during which it engages the tappet 96 just prior to completion of the outward or cutting movement of the carriage. This causes the downward movement of the actuating member 90, and the inward or relief movement of the block 70 from its outer or work-engaging position, as previously determined by the stop members 78 and 79. The cam is formed with a dwell portion 107 which retains the block in this withdrawn position until the end of the return stroke of the carriage 40, whereupon the cam leaves the tappet and permits the spring 98 to urge the actuating member and block to their elevated and outward positions, respectively, as illustrated.

It will also be observed that the speed of reciprocation of the carriage 40 and accompanying cutter 80 is relatively great compared to the speed of rotation of the work spindle 26. Thus, the cutter moves axially with respect to the work and in its rapid movement contacts the entire outer surface of the piston P during the slow rotation thereof.

The cutter or tool 80 is preferably of cylindrical shape for the type of work herein described, having a helical cutting edge 110 formed on a true cylindrical surface at a relatively small helix angle. In longitudinal section, this presents a succession of closely spaced cutting members or teeth 111, the cutting edges of which face the left of the machine and thus are properly adapted to engage the work during the outward stroke of the carriage 40.

For proper operation of the machine, the stroke of the carriage 40 is adjusted so that it is slightly greater than the pitch of the teeth, with the result that a slight overlap of the strokes of adjacent teeth is obtained. This is illustrated in Figs. 7 to 10, inclusive, wherein (Fig. 7) the cutter, at the beginning of its outward stroke, is being driven both to the left by the carriage movement, and toward the work as the result of the release of the relief mechanism. In the diagrammatic view (Fig. 10) this portion of the stroke is indicated by the numeral 113. During the subsequent cutting movement of the cutter (Fig. 8) the block 70 is retained in its outward position, and the teeth 111 move lineally parallel to the axis of the work (as indicated at 114, Fig. 10) each tooth operating in a separate zone on the surface of the piston P. Near the end of this movement, the strokes of successive teeth overlap for a slight distance (115, Fig. 10) and, inasmuch as their edges are in the same plane, the completed cut is continuous in appearance.

The subsequent relief movement of the block 70 (116, Fig. 10) terminates at the end of the outward stroke of the carriage 40, wherein the cutting edges are spaced from the work (Fig. 9) preparatory to the return stroke of the carriage, during which the cutter is retained in this position to clear the work by an adequate distance.

The return of the cutter to the first described position (Fig. 8) completes the cycle, and, as the cutter enters the next cutting stroke, a new portion of the piston or work surface is presented, due to the slow rotation of the work spindle. Upon a complete rotation of the piston, the work carriage 16 may be withdrawn for removal of the piston from the chuck, or, if a subsequent cut is necessary, the carriage may be advanced the desired distance for a second cutting operation.

Various modifications in the cutter structure will permit the invention to be utilized for numerous machining purposes. For example, the cutter shown in Fig. 14, which is devised to machine a shouldered shaft 117, is formed with a cylindrical section 118 adapted to operate on the smaller diameter of the shaft, and a cylindrical section 119 for the remaining section of the shaft. The teeth of this cutter are circular in formation, rather than helical as in the previous embodiment, and they may be formed from a single block or may consist of a fabricated assembly.

It will be appreciated from the foregoing that the cutter may be of any desired shape, provided the teeth are co-planar and parallel to the work surface. The cylindrical form of cutter, herein illustrated, offers several advantages, however, including simplicity of manufacture and maintenance, and its adaptability for rotational adjustment. In its latter aspect, it will be noted that when the active cutting portion of the cutter 80 becomes dull through extended usage, the cutter may be released from its fixed setting and rotated a few degrees to present a new and sharp portion to the work.

The various adjustable features of the carriages of the machine permit it to be utilized for the machining of cylindrical surfaces of a wide range of diameters and lengths, while angular adjustment of the work turret permits it to operate with equal efficiency on conical and other forms of surfaces.

Where more rapid tool wear necessitates frequent adjustment of the cutter, the previously mentioned rotation thereof may be more readily effected by providing an adjustment mechanism, as shown in Figs. 12 and 13. In this embodiment the block 70 is formed to receive rotatably a shouldered sleeve 121 which at one extremity is provided with a worm gear 122. A shaft 123 having an operating portion 124 is mounted in a bracket 125 on the block, and it carries a worm 126 which meshes with the gear 122. The shank 127 of the tool 128 is inserted in the sleeve and secured thereto by nuts 129. Thus, by rotating the worm 126, the gear 122 and accompanying sleeve and tool may be adjusted to any desired radial position.

The work 130 shown in this embodiment differs from that previously described in that it is held stationary relative to the carriage 16 by locking the spindle 26. By operating the carriage feed screw 35, the work is advanced directly into the path of the tool 128 which cuts a shallow arcuate groove 131 in the work face 132. Obviously, if desired, the cross sectional shape of the tool may be varied from the cylindrical form herein illustrated when grooves or seats of different configuration are required.

It is not intended that the invention be limited to the precise mechanical details of the described machine, as obviously these may be modified in various manners to meet the demands occasioned by geometrically differing types of surfaces. In fact, the principles of the invention may be successfully applied to existing machines with certain modifications. For example, a shaper, diagrammatically shown in Fig. 11, is supplied with a tool 135, which, similarly to the cutter 80, is formed with equally spaced cutting teeth 136 disposed in a common plane. The tool is secured to the ram 137 of the shaper, which is adjusted to provide a stroke slightly greater than the pitch of the teeth. The work W is secured to the transverse table 138 and the surface to be machined is flat rather than cylindrical, as in the case heretofore discussed. When the machine is operated, the work surface is fed transversely across the axis of reciprocation of the tool, and the results are similar to those obtained in Figs. 1 to 10, where the work surface S likewise traverses the tool.

I claim:

1. A machine for cutting metal surfaces comprising a tool formed with a plurality of spaced cutting edges disposed in and normal to a common surface and a line wholly located in said surface, means for reciprocating said tool in a direction parallel to said surface and said line and crossways of said edges and through a distance slightly greater than the distance between said edges measured along said line, whereby each edge travels into the zone traversed by adjacent cutting edges to form a continuous cut, and means for holding a piece of work adjacent said common surface and said line to effect the cutting thereof.

2. A machine for cutting metal surfaces comprising a tool formed with a plurality of spaced cutting edges disposed in and normal to a common surface and a line wholly located in said surface, means for reciprocating said tool in a direction parallel to said surface and said line and crossways of said edges and through a distance slightly greater than the distance between said edges measured along said line, whereby each edge travels into the zone traversed by adjacent cutting edges to form a continuous cut, means for holding a piece of work adjacent said common surface and said line to effect the cutting thereof, and means for moving said piece of work to bring into said common surface and the path of said cutting edges a new portion of said work.

3. A machine for cutting metal surfaces comprising a tool formed with a plurality of spaced cutting edges disposed in and normal to a common surface and a line wholly located in said surface, means for reciprocating said tool in a direction parallel to said surface and said line and crossways of said edges and through a distance slightly greater than the distance between said edges measured along said line, whereby each edge travels into the zone traversed by adjacent cutting edges to form a continuous cut, means for holding a piece of work adjacent said common surface and said line to effect the cutting thereof, and means for feeding said tool and said work inwardly toward each other to effect the cutting away of the surface of said work to a progressively increasing depth.

4. A machine for cutting metal surfaces comprising a tool formed with a plurality of spaced cutting edges disposed in and normal to a common surface and a line wholly located in said surface, means for reciprocating said tool in a direction parallel to said surface and said line and crossways of said edges and through a distance slightly greater than the distance between said edges measured along said line, whereby each edge travels into the zone traversed by adjacent cutting edges to form a continuous cut, means for holding a piece of work adjacent said common surface and said line to effect the cutting thereof, and means for moving said piece of work transversely of said common surface to bring into said common surface and the path of said cutting edges a new portion of said work.

5. A machine for cutting metal surfaces comprising a tool formed with a plurality of spaced cutting edges disposed in and normal to a common surface and a line wholly located in said surface, means for reciprocating said tool in a direction parallel to said surface and said line and crossways of said edges, means associated with said reciprocating means for causing said tool to be slightly spaced from said surface during movement of said tool in one direction, means for holding a piece of work in said common surface and said line, and means for moving said work and said tool with respect to each other.

6. A metal cutting machine comprising a bed, a tool carriage mounted thereon, means for imparting a reciprocating movement to the carriage, a tool on the carriage having a plurality of spaced cutting members disposed in aligned relation parallel to and crosswise of the reciprocatory axis of the carriage, a lateral cutting edge on each member, said edges lying in a common surface and being normal to a line therein parallel to said axis, work holding means on the bed, and means for moving the holding means whereby the work therein is caused to traverse the cutting edges of said cutter in a direction substantially perpendicular to the said carriage axis.

7. A metal cutting machine comprising a bed, a tool carriage slidably mounted thereon for reciprocating movement, a tool secured on the carriage and having a plurality of spaced cutting members disposed in aligned relation parallel to and crosswise of the axis of the carriage, a substantially lateral cutting edge on each member, said edges lying in a common surface and being normal to a line therein parallel to said axis, means for imparting to the carriage a reciprocating movement having a stroke slightly greater than the spacing between adjacent cutting members so that an overlap of the strokes of adjacent cutting edges is obtained, work holding means on the bed, and means for moving the holding means whereby the work therein is caused to move with respect to the cutting edges of said tool in a direction substantially perpendicular to said carriage axis.

8. A metal cutting machine comprising a bed, a tool carriage slidably mounted thereon, a tool on the carriage having a plurality of spaced cutting members disposed in aligned relation parallel to and crosswise of the axis of the carriage, a substantially lateral cutting edge on each member, said edges lying in a common surface and being normal to a line therein parallel to said axis, means for imparting to the carriage a reciprocating movement having a stroke slightly greater than the spacing between adjacent cutting members, a second carriage on the bed, work holding means thereon, means for moving the holding means whereby the work therein is caused to traverse the cutting edges of said cutter in a direction substantially perpendicular to the tool carriage axis, and feed means for moving said second carriage and accompanying holding means toward said cutting edges.

9. A metal cutting machine comprising a bed, a tool carriage slidably mounted thereon, a block mounted in the carriage for lateral movement relative thereto, a tool secured to the block and having a plurality of spaced cutting members disposed in aligned relation parallel to the axis of the carriage, a substantially lateral cutting edge on each member, means for imparting to the carriage a reciprocating movement having a stroke slightly greater than the spacing between adjacent cutting members, means for retaining the tool block in a fixed position during one direction of movement of the carriage, means operated by and in timed relation with said reciprocating means for moving said block toward the carriage during the remaining stroke of the carriage, work holding means on the bed, and means for moving the holding means whereby the work therein is caused to traverse the cutting edges of the tool in a direction substantially perpendicular to said carriage axis.

10. A metal cutting machine comprising a bed, a tool carriage slidably mounted thereon, a tool on the carriage having a plurality of spaced cutting members disposed in aligned relation parallel to and crosswise of the axis of the carriage, a lateral cutting edge on each member, said edges lying in a common surface and being normal to a line therein parallel to said axis, means for imparting to the carriage a reciprocating movement, a work carriage mounted on the bed for lateral movement relative to the tool carriage, work holding means rotatably mounted on the work carriage on an axis parallel to the axis of the tool carriage, means for driving said work holding means at a constant speed, and means for moving the work carriage toward the tool carriage to bring the work carried by the holding means thereof into contact with said tool.

11. A metal cutting machine comprising a bed, a tool carriage slidably mounted thereon, a tool on the carriage having a plurality of spaced cutting members disposed in aligned relation parallel to and crosswise of the axis of the carriage, a lateral cutting edge on each member, said edges lying in a common surface and being normal to a line therein parallel to said axis, means for imparting a reciprocating movement to the carriage, a work carriage mounted on the bed for lateral movement relative to the tool carriage, a turret mounted for adjustable movement on the work carriage, work holding means rotatably mounted in the turret on a horizontal axis, means for driving the work holding means at a constant speed, and means for moving the work carriage toward the tool carriage to bring the surface of the work carried thereby into contact with said tool.

12. A metal cutting machine comprising a bed, a tool carriage slidably mounted thereon, a saddle adjustably mounted on the carriage, a tool on the carriage having a plurality of spaced cutting members disposed in aligned relation parallel to and crosswise of the axis of the carriage, a lateral cutting edge on each member, said edges lying in a common surface and being normal to a line therein parallel to said axis, a crank mechanism for imparting a reciprocating movement to the carriage, said mechanism being adjustable to provide a stroke for the carriage slightly greater than the spacing between adjacent cutting members, drive means for the crank mechanism, work holding means on the bed, and means for moving the holding means whereby the work therein is caused to traverse the cutting edges of said tool in a direction substantially perpendicular to said carriage axis.

13. A metal cutting machine comprising a bed, a tool carriage slidably mounted thereon, a cylindrical tool secured to the carriage with its axis disposed parallel to the axis of the carriage, a plurality of spaced annular cutting edges on the tool, said edges being disposed crosswise of said axis and lying in and normal to a common surface and a line therein parallel to said axis, means for imparting a reciprocating movement to the carriage, work holding means on the bed, and means for moving the holding means whereby the work therein is caused to traverse the cutting edges of said tool in a direction substantially perpendicular to said carriage axis.

14. A metal cutting machine comprising a bed, a tool carriage slidably mounted thereon, a cylindrical tool secured to the carriage with its axis disposed parallel to the axis of the carriage, a plurality of spaced annular cutting edges on the tool, said edges being disposed crosswise of said axis and lying in and normal to a common surface and a line therein parallel to said axis, means for imparting a reciprocatory movement to the carriage, a second carriage on the bed, work holding means thereon, means for moving the holding means whereby the work therein is caused to traverse the cutting edges of the tool in a direction substantially perpendicular to the tool carriage axis, and feed means for moving said second carriage to bring the work thereon into tangential contact with said tool.

15. A metal cutting machine comprising a bed, a tool carriage slidably mounted thereon, a cylindrical tool secured to the carriage for radial adjustment, said tool being mounted with its axis disposed parallel to the axis of the carriage, a plurality of spaced cutting edges on the tool, said edges being disposed crosswise of said axis and lying in and normal to a common surface and a line therein parallel to said axis, means for imparting a reciprocatory movement to the carriage, work holding means on the bed, and means for moving the holding means whereby the work therein is caused to traverse the cutting edges of the tool in a direction substantially perpendicular to said carriage axis.

WILLIAM E. SYKES.